(12) United States Patent
Nishiwaki (10) Patent No.: US 6,738,519 B1
(45) Date of Patent: May 18, 2004

(54) CHARACTER RECOGNITION APPARATUS

(75) Inventor: Daisuke Nishiwaki, Tokyo (JP)

(73) Assignee: NEC Corporation, Tokyo (JP)

( * ) Notice: Subject to any disclaimer, the term of this patent is extended or adjusted under 35 U.S.C. 154(b) by 607 days.

(21) Appl. No.: 09/590,261

(22) Filed: Jun. 9, 2000

(30) Foreign Application Priority Data

Jun. 11, 1999 (JP) .......................................... 11-165358

(51) Int. Cl.$^7$ ............................. G06K 9/62; G06K 9/68; G06K 9/46; G06K 9/34
(52) U.S. Cl. ........................ 382/228; 382/218; 382/194; 382/178
(58) Field of Search ................................. 382/173, 174, 382/175, 176, 177, 178, 179, 185, 186, 187, 195, 199, 194, 202, 203, 209, 217, 218, 159, 161, 228; 358/453, 462

(56) References Cited

U.S. PATENT DOCUMENTS

| | | | | |
|---|---|---|---|---|
| 5,058,182 A | * | 10/1991 | Kuan et al. | ................. 382/202 |
| 5,745,600 A | * | 4/1998 | Chen et al. | ................. 382/218 |
| 5,966,460 A | * | 10/1999 | Porter et al. | ................ 382/159 |
| 6,014,460 A | * | 1/2000 | Fukushima et al. | ......... 382/177 |
| 6,449,391 B1 | * | 9/2002 | Ku | ............................. 382/194 |

FOREIGN PATENT DOCUMENTS

| | | | | |
|---|---|---|---|---|
| JP | 62-262194 A | 11/1987 | | |
| JP | 63-316288 A | 12/1988 | | |
| JP | 1-280887 A | 11/1989 | | |
| JP | 2-109187 | 4/1990 | | |
| JP | 3-48379 | 3/1991 | | |
| JP | 3-154985 | 7/1991 | | |
| JP | 4-25989 A | 1/1992 | | |
| JP | 5-114053 | 5/1993 | | |
| JP | 5-290217 | 11/1993 | | |
| JP | 5-298487 A | 11/1993 | | |
| JP | 5-307644 A | 11/1993 | | |
| JP | 5-346974 A | 12/1993 | | |
| JP | 7-192094 | 7/1995 | | |
| JP | 08 171614 | * | 7/1996 | ............ G06K/9/72 |
| JP | 8-202830 A | 8/1996 | | |
| JP | 8-287188 A | 11/1996 | | |
| JP | 2619499 | 3/1997 | | |
| JP | 2734386 | 1/1998 | | |
| JP | 10-162104 | 6/1998 | | |

OTHER PUBLICATIONS

F. Kimurai et al., "A Lexicon Directed Algorithm for Recognition of Unconstrained Handwritten Words", IEICE Trans Ing. & Syst., vol. E77–D, (Jul. 1994), 785–793.

J. Tsukumo et al., Handprinted Kanji Character Recognition based on Flexible Template Matching, Proc. of 11$^{th}$ International Conference Pattern Recognition, (1992), pp. 483–486 with Abstract.

T.M. Ha et al., "Off–Line Handwritten Numeral String Recognition by Combining Segmentation–Based and Segmentation–Free Methods", Pattern Recognition, vol. 31, No. 3 (1998), pp. 257–272 with Abstract.

* cited by examiner

*Primary Examiner*—Mehrdad Dastouri
(74) *Attorney, Agent, or Firm*—Sughrue Mion, PLLC (57) ABSTRACT

There are provided: an n-fold-character recognizing part for collectively recognizing an unmatched portion without segmenting character candidate patterns character by character for an image of a read-wise skipped portion, i.e., the unmatched portion upon word verification; and an n-fold-character recognizing dictionary referred to by the n-fold-character recognizing part upon recognition; to thereby conduct re-recognition independent of instability of character segmentation even when the portion read-wise skipped by the word verification includes two or more characters.

11 Claims, 7 Drawing Sheets

Inputted Word Image
(correct answer
: "Hundred")

⇩

Segmentation Result

⇩

Recognition Result

⇩

Word
Verification   Matching
Result         Number : 3
               ∨
               Matching
               Number : 2

CHARACTER RECOGNITION APPARATUS

CROSS REFERENCE TO RELATED APPLICATIONS

The present invention claims priority from Japanese Patent Application No. 11-165358 filed Jun. 11, 1999, the contents of which are incorporated herein by reference.

BACKGROUND OF THE INVENTION

1. Field of the Invention

The present invention relates to a character recognition apparatus for automatically reading a character string from an inputted image data. Concretely, the present invention relates to an apparatus for reading such as a residence address, name or product number written on a mail and document, and to a pen-inputting apparatus for inputting a character string by a stylus pen.

2. Description of Related Art

Figure 9:
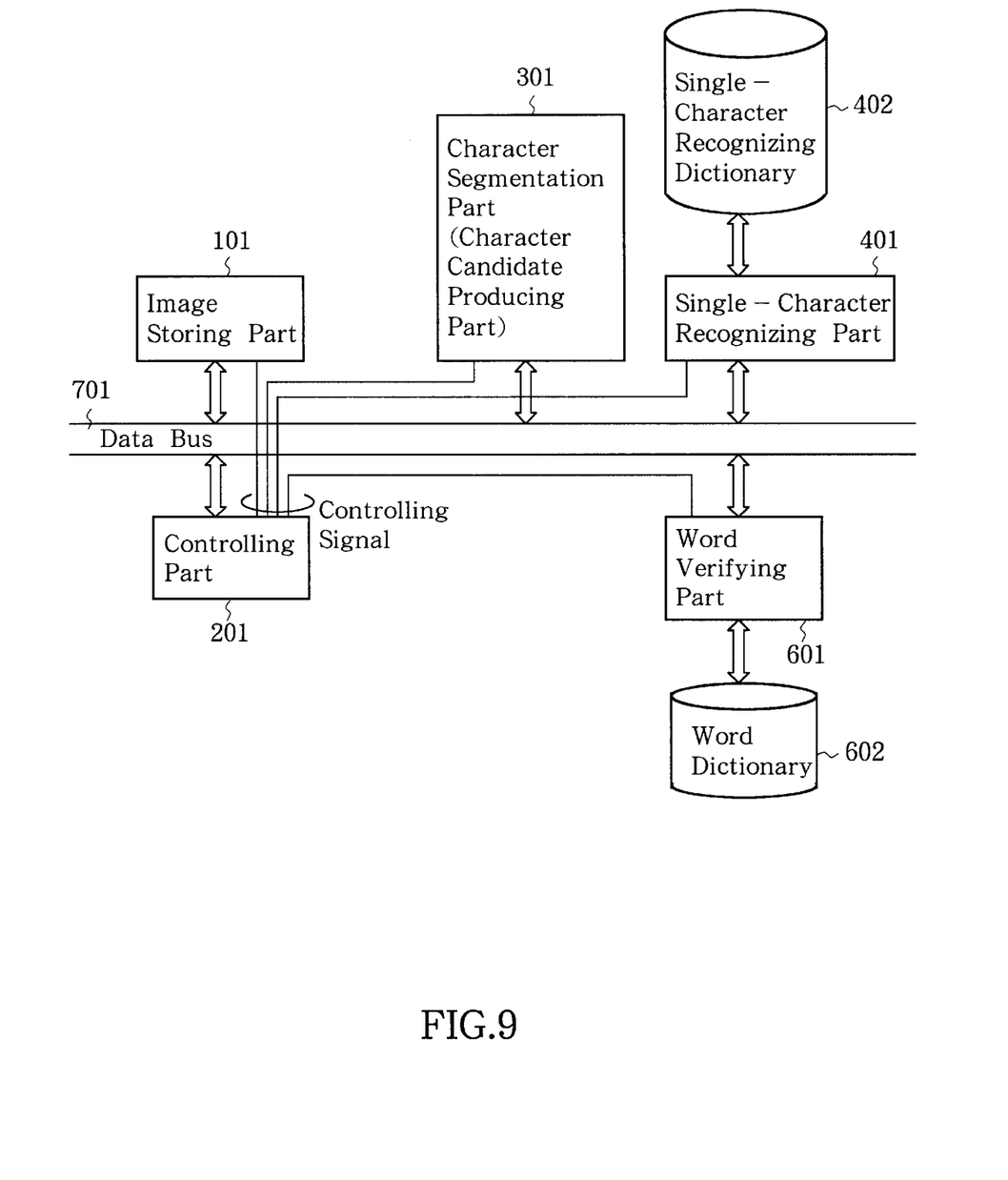
FIG. 9 is a constitutional block diagram of essential parts of a conventional character recognition apparatus.
Figure 10:
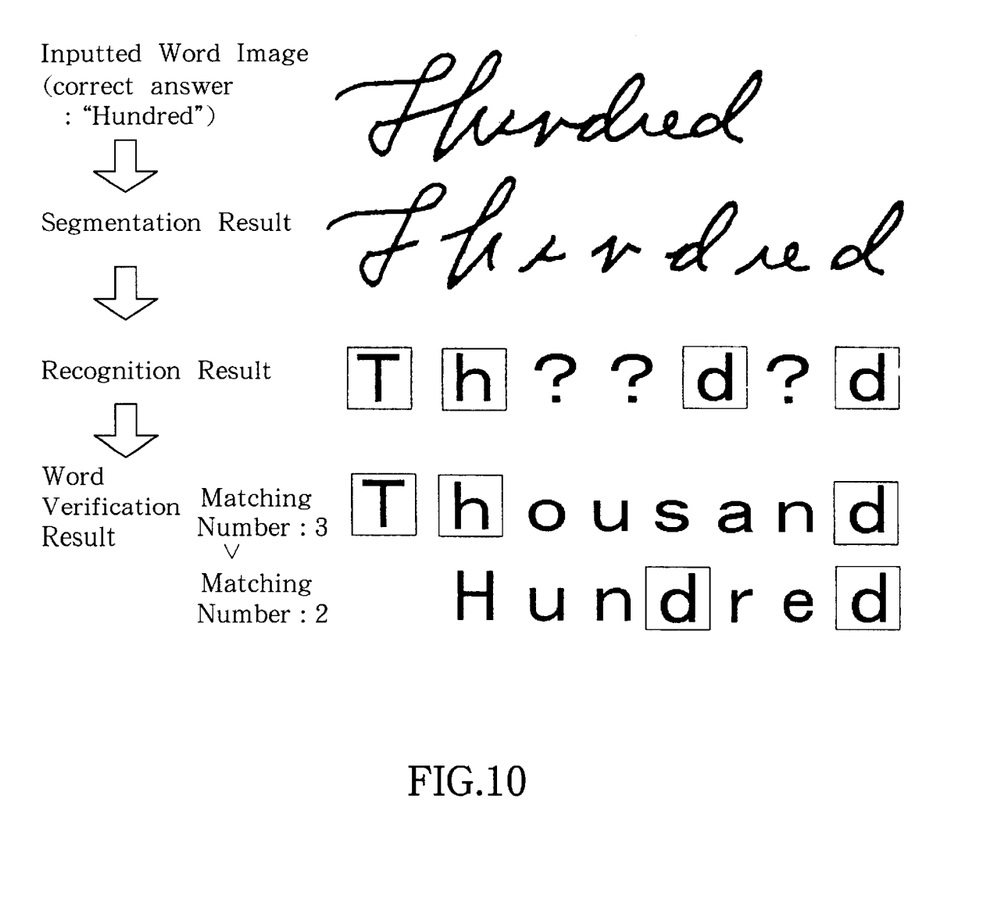
FIG. 10 is a view for explaining a character recognition operation in the prior art.

There will be firstly explained a conventional character recognition apparatus with reference to FIGS. 9 and 10. FIG. 9 is a constitutional block diagram of essential parts of the conventional character recognition apparatus. FIG. 10 is a view for explaining how to recognize a character by the conventional technique. Herein, there will be particularly described the conventional technique concerning a character recognition apparatus aiming at reading a character string constituted of a plurality of characters, i.e., a word(s).

As shown in FIG. 9, in case of reading a character string constituted of a plurality of characters like a word such as a residence address and name as well as a product code making use of a character segmentation part 301 serving as character segmentation means for segmenting character by character and a single-character recognizing part 401 serving as character recognizing means for recognizing character by character, it is unlikely that all of the character patterns segmented at the character segmentation part 301 are precisely recognized at the single-character recognizing part 401. As such, by providing a "word" dictionary 602 serving as word data storing means for storing words to be recognized, it becomes possible to improve a "word-wise" recognition performance, by searching, from the word dictionary 602 via word verifying part 601, that word which has the largest number of matched characters for the recognition result, even if some characters of the recognized character string are not correctly recognized at the single-character recognizing part 401. Examples of character recognition apparatus having such a constitution are disclosed in Japanese Patent Application Laid-Open No. HEI-2-109187 titled "Post-Processing Method of Closely Written Addresses" (hereinafter called "reference 1"), and Japanese Patent Application Laid-Open No. HEI-5-114053 titled "Post-Character-Recognition Processing Method" (hereinafter called "reference 2").

However, in those methods based on verification such as disclosed in the reference 1 and reference 2, erroneous correction will occur upon verification, as the inter-character contact increases in the character string to be recognized or the number of words to be recognized increases. This is because the character segmentation part 301 does not previously hypothesize the number of characters to be segmented; and particularly because a lot of candidates for the word to be recognized are enumerated from the recognition result for character candidate patterns obtained as the segmentation result when a lot of inter-character contacts are included in the original character string, resulting in difficulty in narrowing down the candidates into a correct answer.

Contrary, such as shown in F. Kimura et al., "A Lexicon Directed Algorithm for Recognition of Unconstrained Handwritten Words", IEICE Trans. INF. & SYST., Vol.E77-D, No. 7 (1994.7) (hereinafter called "reference 3"), there exists a recognition method in which: several words are previously hypothesized for the original word to be recognized, character candidate patterns are generated for respective hypothetical words by segmenting characters from the original word based on the respective numbers of characters included in the hypothetical words, and character recognition is individually performed for the respective character candidate patterns, to thereby resultingly decide how the recognition result is close to the hypothetical word, making use of a magnitude of word certainty level to be expressed by a sum or product of the reliability levels of the individual character recognition for each of the character candidate patterns. However, even this method has such a defect that: when there exist, for the word to be recognized, two similar hypothetical words one of which includes a "single character " which is different from the corresponding "single character" of the other, these hypothetical words may not be distinguished from each other. This is because the decision is done based on the evaluation value for the whole of the character string so that occurrence of lower certainty levels of recognition result for the character string is not suitably considered.

In each of the word recognition methods disclosed in the references 1 through 3, those portions of the character candidate patterns obtained by character-segmentation, which portions are unrecognizable or which portions have lower certainty levels, are supplemented by jointly using a word information making use of the suitably recognized portions. At this time, those portions, which are unrecognizable or have a lower certainty level, i.e., which have been read-wise skipped, are not checked as to whether the characters supplemented by the word verification are really correct or not, resulting in the aforementioned misrecognition of similar words.

Meanwhile, such as disclosed in Japanese Patent No. 2734386 titled "Character String Recognition Apparatus" (hereinafter called "reference 4"), in order to avoid misrecognition due to the aforementioned read-wise skipping, those read-wise skipped portions of the character candidate patterns are re-recognized by a method different from the initially utilized character recognition method. In this way, there can be prepared the character recognition results for all of the characters constituting the word, to thereby expel ambiguous portions therefrom, resulting in reduction of misreading. In this method, however, since the check for those read-wise skipped portions is performed by individual character recognition, it is necessary that the characters have been segmented character by character. For example, when it is intended to perform the aforementioned re-recognition on a portion where a contact of two characters has occurred, it is required that the portion has been correctly segmented into two pieces of character candidate patterns. Otherwise, i.e., when the image corresponding to two characters has not been correctly divided into two pieces of patterns, misrecognition will occur.

In the conventional examples as described above with respect to the references 1 through 4, the re-recognition as a check can not be performed, when the ambiguous portion upon jointly using the word information, i.e., the skipped portion, includes a contact of two or more of characters and such a portion has not been correctly segmented resulting in recognition of the strictly most "similar" word in the word verification. As a result, misrecognition is problematically caused, such as in case of existence of another word having a different portion only which has been accidentally skipped. Similar problems are caused in those character recognition techniques as disclosed in Japanese Patent Application Laid-Open Nos. HEI-3-48379, HEI-3-154985, HEI-5-290217, HEI-7-192094 and Japanese Patent No. 2619499, in addition to the conventional examples as explained concerning the references 1 through 4.

FIG. 10 shows a concrete example thereof. In this figure, the correct answer is the word "Hundred". However, the recognition result becomes "Th????d", in case of using only the character segmentation means and the character recognizing means, before performing the word verification. In case of performing the word verification based on this result when the recognition target is a numerical word, there is selected the word "Thousand" as the closest word, resulting in misreading. In this respect, the aforementioned reference 4 further checks, based on another individual character recognition, the partial patterns corresponding to the portion "ousan" as read-wise skipped by the verification. However, when the character segmentation is not correct as shown in this example, the read-wise skipped portions are not correctly recognized.

SUMMARY OF THE INVENTION

The present invention has been carried out in view of the circumstances as described above, and it is therefore an object of the present invention to provide a character recognition apparatus and a recording medium recorded with a character recognition program, capable of realizing a word recognition with higher recognition accuracy without ambiguousness by newly realizing re-recognizing means independent of instability of character segmentation even when the portion read-wise skipped by the word verification includes two or more characters. It is another object of the present invention to provide a character recognition apparatus and a recording medium recorded with a character recognition program capable of accelerating a processing speed.

According to the present invention, the character recognition apparatus is constituted to newly include: an n-fold-character recognizing part for collectively recognizing an unmatched portion without segmenting character candidate patterns character by character for an image of a read-wise skipped portion, i.e., the unmatched portion upon word verification; and an n-fold-character recognizing dictionary referred to by the n-fold-character recognizing part upon recognition; in order to realize verification independent of instability of character segmentation even when the portion read-wise skipped upon word verification includes two or more characters.

Namely, the first aspect of the present invention is a character recognition apparatus which is characterized by comprising: image storing means for inputting and storing a character string image; character segmentation means for producing character candidate patterns character by character for the character string image inputted into the image storing means, and for detecting a character-contacting portion in the character string image to thereby estimate the number of characters in the character-contacting portion; single-character recognition means for deciding character codes for the character candidate patterns character by character produced by the character segmentation means, and for outputting certainty levels of the character codes; a single-character recognizing dictionary to be used by the single-character recognition means for decision; n-fold-character recognition means for deciding character codes corresponding to n pieces of characters, when the character-contacting portion detected by the character segmentation means is estimated to include the n pieces of characters; an n-fold-character recognizing dictionary to be used by the n-fold-character recognition means for decision; and controlling means for controlling the image storing means, the character segmentation means, the single-character recognition means and the n-fold-character recognition means.

The character recognition apparatus may be constituted to further comprise: word verification means for outputting verified words in a descending order of a matching number of characters for the registered candidate words, in accordance with the single-character recognition results obtained by the single-character recognition means and the n-fold-character recognition results obtained by the n-fold-character recognition means; and a word dictionary to be used by the word verification means upon verification.

It is preferable that: the controlling means includes conducting/adopting means; and when the reliability levels outputted by said single-character recognition means for character candidate patterns character by character obtained by the character segmentation means are low and the character candidate patterns have been obtained from the character-contacting portion detected by the character segmentation means, the conducting/adopting means conducts an n-fold-character recognition operation for the character-contacting portion including the character candidate patterns, and adopts the recognition result of the thus conducted n-fold-character recognition operation.

It is also possible that the controlling means includes: adopting/stopping means: for adopting the recognition results outputted from the single-character recognition means by examining certainty levels for all of the recognition results character by character for the character string image and if all the certainty levels are larger than a predetermined value, when there exists, among the verification results obtained from the word verification means, such a verification result completely corresponding to the recognition result outputted from the single-character recognition means for the character candidate patterns character by character obtained by the character segmentation means; and for stopping the recognition for the inputted character string image, otherwise; sending means for sending partial character string images corresponding to the unmatched portions in the single-character recognition results upon word verification, toward the n-fold-character recognition means, together with the estimated number of characters and the estimated character codes of the unmatched portions, in a descending order of a matching number of characters for the triedly verified words; when there exist, among the verification results obtained from the word verification means, no verification results completely corresponding to the recognition result outputted from the single-character recognition means for the character candidate patterns character by character obtained by the character segmentation means; and means for conducting such that: the n-fold-character recognition means re-recognizes the partial character string images sent from the sending means and outputs the recognition results and certainty levels therefor; such that: when each of certainty levels for pertinent recognition results is larger than a predetermined value, each of the pertinent words being verified is kept as a final candidate, and there is calculated an evaluation value for each of the whole character strings being verified, making use of the certainty level outputted by the single-character recognition means for the portion for which the single-character recognition means has been activated and making use of the certainty level outputted by the n-fold-character recognition means for the portion for which the n-fold-character recognition means has been activated; and such that: that word, which has the largest evaluation value among the words kept as the final candidates among the verified words, is adopted as a recognition result for the inputted character string.

Moreover, it is preferable that the character segmentation means is constituted to include means for detecting a character boundary between contiguous characters upon producing the character candidate patterns character by character from the character-contacting portion, making use of a transition of run lengths of contiguous runs upon tracing black pixels in a vertical direction relative to a character string direction for black pixels of the character-contacting portion.

Alternatively, it is preferable that the character segmentation means is constituted to include means for detecting a character boundary between contiguous characters upon producing the character candidate patterns character by character from the character-contacting portion, making use of a maximum point and a minimum point in a vertical direction relative to a character string direction for a character stroke of the character-contacting portion.

Further, it is preferable that the n-fold-character recognition means is constituted to include: means: for conducting recognition for the whole of the character-contacting portion without dividing the character-contacting portion into character candidate patterns character by character; and for outputting a certainty level of the recognition result thereof; while storing a recognizing dictionary for the whole recognition, in the n-fold-character recognizing dictionary.

It is preferable that the n-fold-character recognition means is constituted to include: means: for assuming a rectangle surrounding a partial character string image corresponding to the character-contacting portion upon conducting recognition for the whole of the character-contacting portion without dividing the character-contacting portion into character candidate patterns character by character; for setting an area having a height corresponding to the height of the rectangle, and a width equal to or smaller than a single character width; for conducting recognition making use of a transition of a feature within the area, the transition being obtained for each movement of the area from one end of the rectangle toward the other end thereof; and for outputting a certainty level of the thus obtained recognition result; while storing a recognizing dictionary therefor, in the n-fold-character recognizing dictionary.

In this way, it becomes possible: to realize a word recognition with higher recognition accuracy without ambiguousness by newly realizing re-recognizing means independent of instability of character segmentation even when the portion read-wise skipped by the word verification includes two or more characters; and to accelerate a processing speed.

Namely, as a first effect of the present invention, there can be achieved a remarkable improvement in a recognition performance for a character string including character contiguity or character agglomeration. This is because, there is conducted the recognition making use of the n-fold-character recognizing part as a feature of the present invention for the unmatched portion upon word verification, to thereby achieve a correct recognition even when the unmatched portion includes contiguous characters, so that ambiguousness can be fully solved. As a result, there can be drastically suppressed misreading of character strings due to misrecognition of character candidate patterns obtained by erroneous character segmentation as mentioned in relation to the prior art.

Next, as a second effect of the present invention, acceleration of processing speed can be achieved. While the character recognition apparatus of the present invention embraces the n-fold-character recognition as its feature, there is required an extremely long period of time when the whole of the character string is recognized by the n-fold-character recognition only, as compared to a procedure in which character recognition is conducted character by character after dividing the character string into character candidate patterns character by character by character segmentation. Nonetheless, in the character recognition apparatus of the present invention, the n-fold-character recognition is effected only for the applicable portions such as when a recognition result having a lower reliability level upon single-character recognition is obtained (first embodiment) or when there exists an ambiguous portion as a result of word verification, both cases being after conducting character segmentation. Thus, there can be drastically reduced the amount of processing, as compared to a situation where the n-fold-character recognition is applied to the whole of the inputted character string. As a result, as compared to such an integrating method in which a recognition procedure based on a character segmenting operation and a recognition procedure to be collectively conducted for the whole of the character string are independently executed for an inputted character string, and the recognition results of both procedures are later integrated to thereby decide a final recognition result; the character recognition apparatus of the present invention performs the n-fold-character recognition by presuming a required minimum number of characters, and also by presuming character codes in case of word recognition, so that the recognition result can be obtained at an extremely high speed; whereas in the aforementioned integrating method, the latter recognition procedure to be collectively conducted for the whole of the character string becomes a bottleneck even if both recognition procedures are parallelly processed.

The second aspect of the present invention is a machine readable recording medium recorded with a character string recognition program to be executed on a computer, the character string recognition program being characterized by comprising the steps of: inputting and storing a character string image; producing character candidate patterns character by character for the inputted character string image, and detecting a character-contacting portion in the character string image to thereby estimate the number of characters in the character-contacting portion; deciding character codes for the produced character candidate patterns character by character, and outputting certainty levels of the character codes; when each of these certainty levels are smaller or equal to a predetermined value and involved in the character-contacting portion, deciding character codes corresponding to n pieces of characters for the character-contacting portion, and outputting a certainty level therefor, and when each of the certainty levels of the single-character recognition results and the n-fold-character recognition results is larger than a predetermined value, outputting the recognition results as a recognition result for the inputted character string.

Alternatively, the machine readable recording medium is recorded with a character string recognition program to be executed on a computer, the character string recognition program comprising: a step for inputting and storing a character string image; a step for producing character candidate patterns character by character for the inputted character string image, and detecting a character-contacting portion in the character string image to thereby estimate the number of characters in the character-contacting portion; a step for deciding character codes for the produced character candidate patterns character by character, and outputting certainty levels of the character codes; a word verification step for outputting verified words in a descending order of a matching number of characters for the registered candidate words, and outputting the unmatched portions for the respective verified words; an n-fold-character recognition step: for obtaining, from the inputted image, partial images corresponding to the unmatched portions for the respective verified words obtained from the word verification step; for deciding character codes corresponding to a plurality of characters, for which a number of characters and character codes are estimated; and for outputting certainty levels of the decided character codes; and a step for outputting, when each of the certainty levels of the single-character recognition results and the n-fold-character recognition results is larger than a predetermined value, the recognition results as a recognition result for the inputted character string.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

First Embodiment

Figure 1:
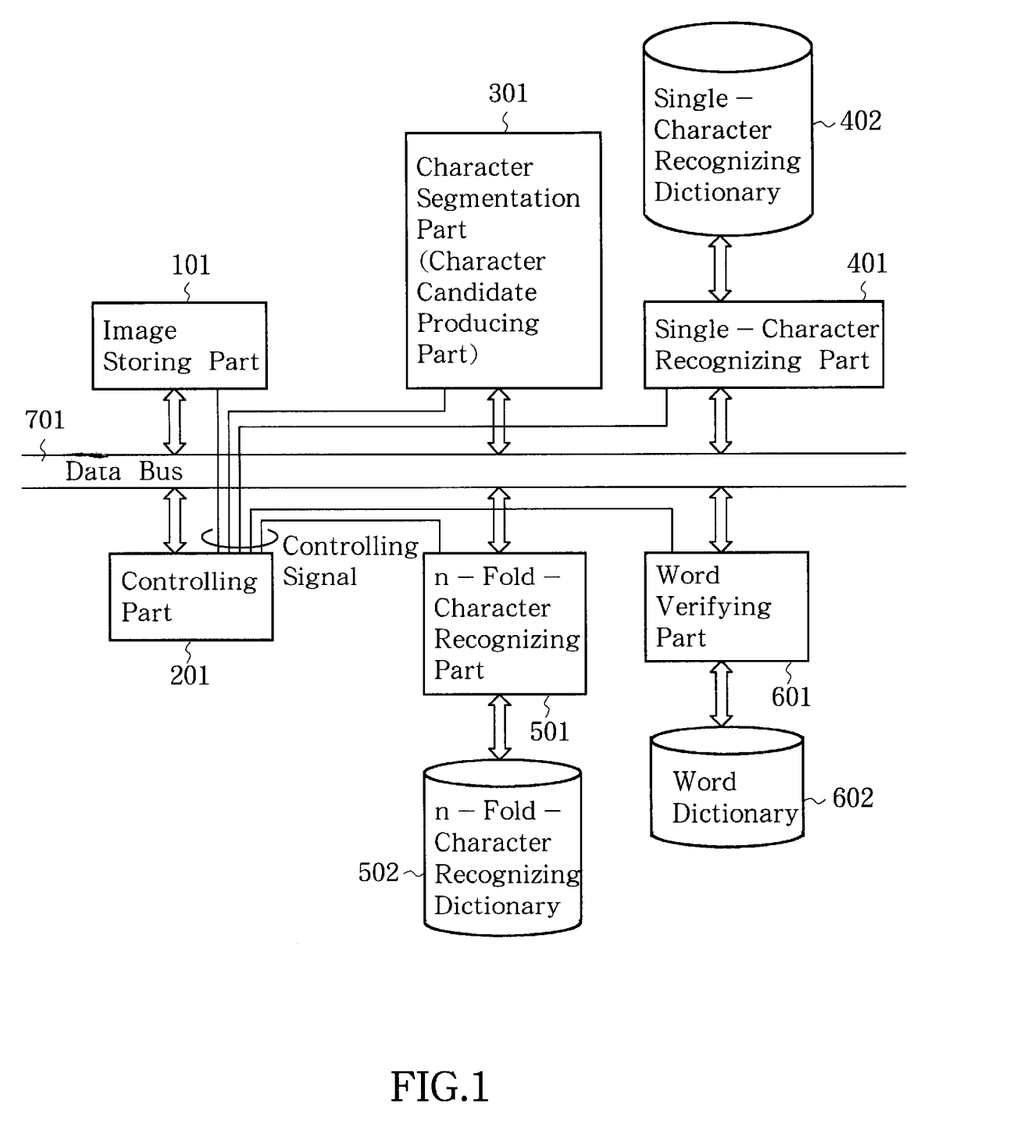
FIG. 1 is a constitutional block diagram of essential parts of a character recognition apparatus according to a first embodiment of the present invention.

There will be described in detail a constitution of a character recognition apparatus according to a first embodiment of the present invention with reference to FIG. 1. FIG. 1 is a constitutional block diagram of essential parts of the character recognition apparatus according to the first embodiment of the present invention. As shown in FIG. 1, the character recognition apparatus according to the first embodiment of the present invention is characterized in that this apparatus comprises: an image storing part 101 for inputting and storing a character string image; a character segmentation part 301 for producing a character candidate pattern character by character for the character string image inputted in the image storing part 101, and for detecting a character-contacting portion to thereby estimate the number of contacting characters; a single-character recognizing part 401 for deciding a character code for a candidate character image produced by the character segmentation part 301 character by character, and for outputting a certainty level of the character code; a single-character recognizing dictionary 402 to be used by the single-character recognizing part 401 for decision thereby; an n-fold-character recognizing part 501 for deciding character types corresponding to n pieces of characters when the character segmentation part 301 has estimated that the character-contacting portion detected by the character segmentation part 301 includes n pieces of characters; an n-fold-character recognizing dictionary 502 to be used by the n-fold-character recognizing part 501 for decision thereby; a word verifying part 601 for outputting verified words in a descending order of a matching number of characters for the registered candidate words, making use of the single-character recognition result obtained by the single-character recognizing part 401 and the n-fold-character recognition result obtained by the n-fold-character recognizing part 501;a word dictionary 602 to be used by the word verifying part 601 upon verification; and a controlling part 201 for controlling the image storing part 101, character segmentation part 301, single-character recognizing part 401 and n-fold-character recognizing part 501.

Figure 2:
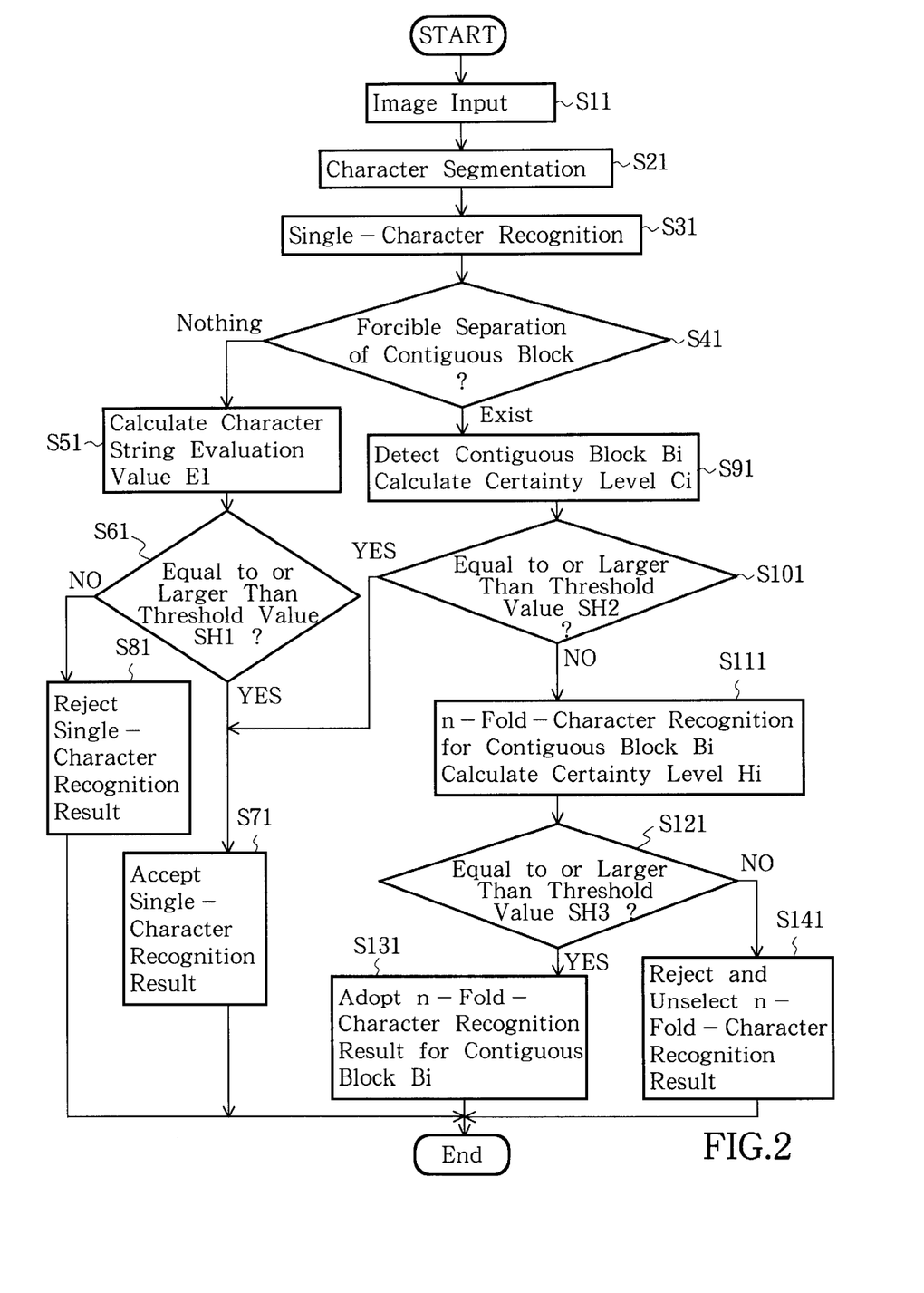
FIG. 2 is a flowchart showing an operation of the character recognition apparatus according to the first embodiment of the present invention.

There will be described hereinafter an operation of the character recognition apparatus of the present invention, with reference to FIG. 2. FIG. 2 is a flowchart showing the operation of the first embodiment of the present invention. The series of operations to be described hereinafter are performed by the controlling part 201 shown in FIG. 1. The controlling part 201 controls the operations of the image storing part 101, character segmentation part 301, single-character recognizing part 401, n-fold-character recognizing part 501 and word verifying part 601, and can be realized such as on a computer insofar as the same is capable of sending/receiving data to/from the respective parts via data bus 701 and of issuing control signals to the respective parts.

Figure 3:
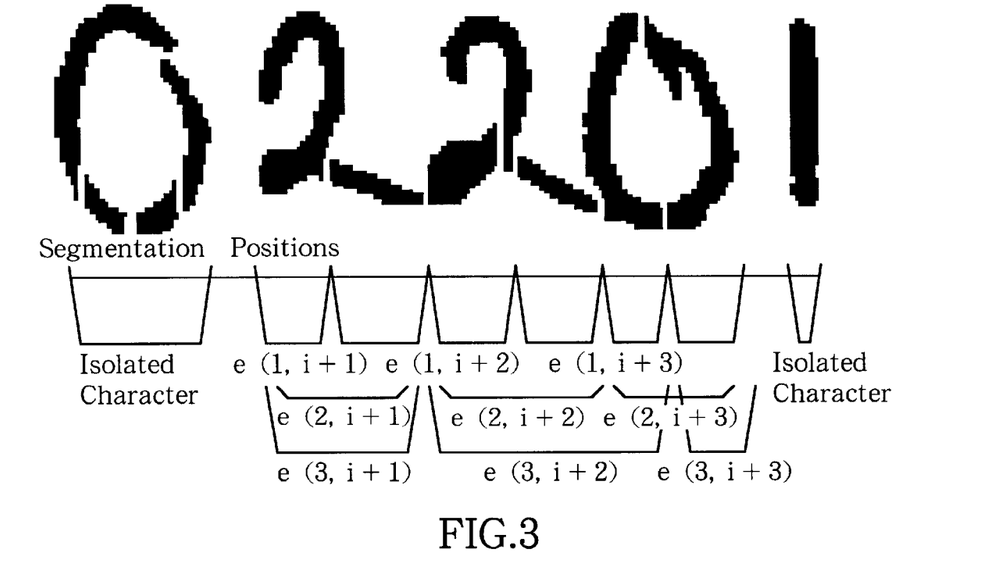
FIG. 3 is a view for explaining a character segmenting operation.

The recognition target character string image is converted into an electrical signal by photoelectrical converting means such as a scanner or stylus pen, and the converted character string image is accumulated into the image storing part 101 via data bus 701 (step S11). The image storing part 101 can be realized by a general memory device used in a computer apparatus. Further, the inputted image is constituted of a plurality of characters such as shown in FIG. 3.

Figure 4:
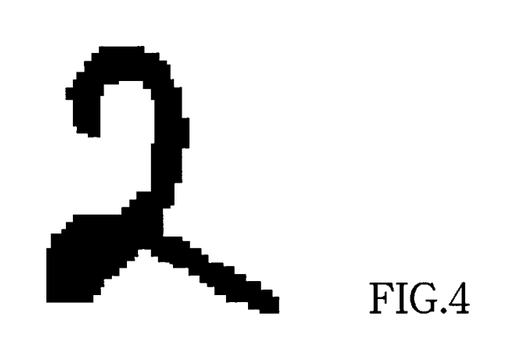
FIG. 4 is a view for explaining an example of a character candidate pattern.

Next, the character segmentation part 301 conducts a character segmenting operation for the character string image stored in the image storing part 101, to thereby detect character areas from the character string image, character by character (step S21). This character segmenting operation can be realized on a computer, such as making use of "Nishiwaki and Yamada: A Contacted Numeral Segmentation Method on Black Ruled Line Forms; The Institute of Electronics, Information and Communication Engineers, Information and System Society Conference, D-12-3 (1997)". In the character string of FIG. 3, for example, there can be detected cutting candidates of characters based on the vertical white runs for the character-contacting portion (character-agglomerating portion). The characters noncontiguous to others can be realized by detecting those profiles shorter than a certain width, which profiles are obtained by projecting black pixels onto a horizontal axis. There are arbitrarily selected two of character boundaries detected for the contiguous characters, and the portion interposed between the selected character boundaries is treated as a character candidate pattern. For example, concerning a contiguous pattern of three characters "220" in FIG. 3, there is generated a character candidate pattern shown in FIG. 4, when the 2nd and 4th cutting candidates are selected from the left, among those obtained cutting candidates. For a single character string pattern, there can be generated a plurality of combinations of candidate characters, as the case may be. In FIG. 3 for example, there exist three kinds of character segmentation possibilities.

Next, for the respective character candidate patterns generated at step S21, there is conducted a character recognition operation at the single-character recognizing part 401 (step S31). This single-character recognition operation can be realized on a computer, such as making use of "Tsukumo et al.: Handprinted Kanji Character Recognition based on Flexible Template Matching Proc. of 11th Intl. Conf. Pattern Recognition, pp.483–486 (1992)". The reliability level for the character recognition result may be obtained such as by taking a ratio of a distance value for a recognition result in the second place relative to distance value for a recognition result in the first place, and the single-character recognizing dictionary 402 is stored with features for verification extracted from character patterns for learning. The single-character recognizing dictionary 402 may be set in a memory accessible from the single-character recognizing part 401.

Next, it is judged whether characters in the character string have contacted with each other upon character segmentation (step S41). In case that no characters have contacted with each other and all the characters constituting the character string are constituted of isolated patterns, respectively, there is calculated an evaluation value E1 of the character string (step S51). The evaluation value E1 of the character string may be calculated from the reliability levels for the recognition results of single-character recognition operations, and may be expressed by a product or sum of reliability levels of all the single-character recognition results.

It is judged whether this character string evaluation value E1 is larger than a predetermined value (step S61). If larger, the single-character recognition results for the isolated character patterns obtained at the step S31 are adopted as the recognition result for the inputted character string (step S71). Contrary, if the character string evaluation value is smaller than the predetermined value, the single-character recognition results for the inputted character string are rejected (step S81). At this time, it is possible to individually examine the reliability levels of the single-character recognition results for respective isolated character patterns, and to output only those recognition results having higher reliability levels. Note, the aforementioned SH1 can be set by investigating that range from the character string for learning, in which range no misrecognition will occur. Also, the magnitude of reliability level large enough for adopting the single-character recognition result for each isolated character pattern can be set such as by investigating the upper limit value of reliability level for misread patterns among those patterns used for learning of the character segmentation part 301.

Meanwhile, in case that characters have contacted with each other upon character segmentation at step S41, there are taken out those portions in which characters are contacting with each other as contiguous blocks Bi (i<the number of characters), and the certainty levels Ci for contiguous blocks Bi are calculated (step S91). Ci may be expressed by a product or sum of reliability levels for recognition results of single-character recognition obtained at the step S31, for character candidate patterns constituting the contiguous blocks. At this time, when the certainty levels Ci for all the contiguous blocks Bi are equal to or larger than a certain value SH2 (step S101), the single-character recognition results obtained at the step S31 are adopted as the recognition result for the inputted character string (step S71). At this time, there exist a plurality of kinds of combinations of character candidate patterns for the contiguous pattern, as shown in FIG. 3. In FIG. 3, there exist three kinds of combinations, and the reliability levels of recognition results for respective character candidate patterns are as follows:

$$\{e(1, i+1), e(1, i+2), e(1, i+3)\},$$

$$\{e(2, i+1), e(2, i+2), e(2, i+3)\},$$

and $$\{e(3, i+1), e(3, i+3)\}.$$

In such a case, the certainty level C1 for this contiguous block B1 "220" may be obtained by adopting that certainty level having the maximum sum total or maximum product total within "{" and "}". As the aforementioned SH2, there may be previously obtained a value of certainty level causing no misreading, from contiguous blocks for learning.

Figure 5:
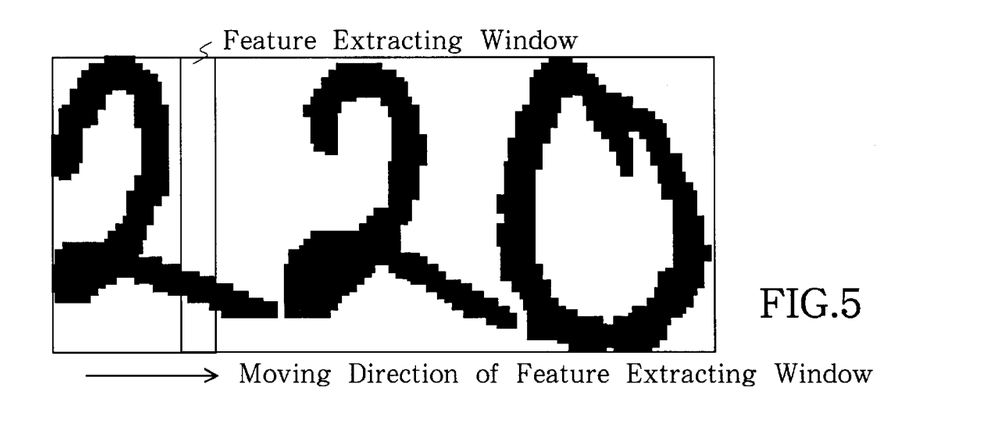
FIG. 5 is a view for explaining an n-fold-character recognition operation.

Meanwhile, at step S101, if a certainty level Hi for a pertinent contiguous block Bi is smaller than the pertinent value SH2, the image of the pertinent contiguous block is sent to the n-fold-character recognizing part 501. At the n-fold-character recognizing part 501, the whole of the contiguous block is recognized at once without dividing the contiguous block into character candidate patterns character by character, and there are outputted: recognition results corresponding to the number of characters in the contiguous block; and a certainty level Hi for the recognition results; (step S111). The n-fold-character recognizing dictionary 502 is stored with features for verification extracted from character string patterns for learning. The n-fold-character recognizing dictionary 502 may be set in a memory accessible from the n-fold-character recognizing part 501. Such as shown in FIG. 5, the n-fold-character recognizing part 501 utilizes, for the contiguous block, a feature extracting window having a few tenth of a single character width, and keeps on extracting features within the feature extracting window while moving this feature extracting window from one end of the character string toward the other end thereof. As the features, there may be adopted the directional features used in the aforementioned "Tsukumo et al.: Handprinted Kanji Character Recognition based on Flexible Template Matching Proc. of 11th Intl. Conf. Pattern Recognition, pp.483–486 (1992)", and this feature change is applied to a state transition of automation to thereby perform recognition making use of a transitional situation of the state. Concretely, it can be realized on a computer, making use of "T. M. Ha et al.; Off-line Handwritten Numeral String Recognition by Combining Segmentation-based and Segmentation-free Methods, Pattern Recognition, Vol. 31, No. 3, pp. 257–272 (1998.3)". Moreover, character string may be expressed by a graph treating the end points and intersecting points of the former as nodes, to thereby conduct graph matching. Note, in case that the number of characters within a character string is previously known, information about the corresponding number of characters for a contiguous block is passed to an n-fold-character recognition operation, for use in recognition. Further, in case of recognizing a contiguous block by the aforementioned method, there may be used a likelihood to be calculated simultaneously with a recognition result by the aforementioned method, for the recognition results corresponding to the number of characters within the contiguous block as well as the certainty level Hi for the recognition results.

Next, at step S121, there are examined the recognition results corresponding to the number of characters within the contiguous block as well as the magnitude of certainty level Hi for the recognition results, as calculated by the n-fold-character recognizing part 501 at step S111. When the certainty level Hi is equal to or larger than SH3, the recognition result by the n-fold-character recognizing part for the contiguous block Bi is adopted and outputted together with the recognition results by the single-character recognizing part for isolated characters (step S131). At this time, when the reliability level for the recognition results at the single-character recognizing part is small, only applicable portions are rejected and only the n-fold-character recognition result may be outputted. The lower limit value of a reliability level for adopting a single-character recognition result can be decided making use of a learning pattern used upon producing the single-character recognizing dictionary.

Meanwhile, when the certainty level Hi is smaller than SH3, the recognition result by the n-fold-character recognizing part is rejected (step S141). Thus, the character string is rejected, since necessary recognition results for all characters constituting the character string are not gathered. At this time, however, when the reliability levels for the recognition results by the single-character recognizing part are large, only the result obtained by the n-fold-character recognizing part 501 may be rejected, and only those portions, the single-character recognition results of which have been obtained, may be outputted. Note, the aforementioned SH3 may be set to a value making use of the learning patterns such that they are not misread.

Second Embodiment

There will be described hereinafter a second embodiment of the present invention with reference to FIG. 6. Similarly to the first embodiment of the present invention, the series of operations to be described hereinafter are performed by the controlling part 201. The controlling part 201 controls the operations of the image storing part 101, character segmentation part 301, single-character recognizing part 401, n-fold-character recognizing part 501 and word verifying part 601, and can be realized such as on a computer insofar as the same is capable of sending/receiving data to/from the respective parts via data bus 701 and of issuing control signals to the respective parts.

The recognition target character string image is converted into an electrical signal by photoelectrical converting means such as a scanner or stylus pen, and the converted character string image is accumulated into the image storing part 101 via data bus 701 (step S12). The image storing part 101 can be realized by a general memory device used in a computer apparatus. Further, the inputted image is constituted of a plurality of characters such as shown in FIG. 3. There will be described hereinafter the operation making use of "Hundred" exemplarily shown in FIG. 10.

Next, the character segmentation part 301 conducts a character segmenting operation for the character string image stored in the image storing part 101, to thereby detect character areas from the character string image, character by character (step S22). Similarly to the first embodiment of the present invention, this character segmenting operation can be realized on a computer, such as making use of "Nishiwaki and Yamada: A Contacted Numeral Segmentation Method on Black Ruled Line Forms; The Institute of Electronics, Information and Communication Engineers, Information and System Society Conference, D-12-3 (1997)". For example, the character string "Hundred" exemplarily shown in FIG. 10 is divided into seven character candidate patterns.

Next, for the respective character candidate patterns generated at step S22, there is conducted a character recognition operation at the single-character recognizing part 401 (step S32). Similarly to the first embodiment of the present invention, this single-character recognition operation can be realized on a computer, such as making use of "Tsukumo et al.: Handprinted Kanji Character Recognition based on Flexible Template Matching Proc. of 11th Intl. Conf. Pattern Recognition, pp.483–486 (1992)". The reliability level for the character recognition result may be obtained such as by taking a ratio of a recognition result in the second place relative to a recognition result in the first place, and the single-character recognizing dictionary 402 is stored with features for verification extracted from character patterns for learning. The single-character recognizing dictionary 402 may be set in a memory accessible from the single-character recognizing part 401. The character string "Hundred" exemplarily shown in FIG. 10 is divided into seven character candidate patterns by the character segmentation part 301, and there is outputted the recognition result, "T", "h", "?", "?", "d", "?", "d". Here, "?" means that the single-character recognizing part 401 did not output a recognition result for an applicable character candidate pattern, i.e., rejected.

Next, there is conducted verification at the word verifying part 601, making use of the result obtained by the single-character recognizing part 401 (step S42). Words for verification have been stored in the word dictionary 602. This word dictionary 602 may be stored in a memory which can be referred to by the word verifying part 601. The word verifying part 601 takes out words stored in the word dictionary 602 one by one, calculates the number of matched characters relative to the result obtained by the single-character recognizing part 401, and outputs the words in a descending order of the number of matched characters. The number of matched characters can be calculated based on how many characters constituting the words in the word dictionary correspond to the characters in the result obtained by the single-character recognizing part, and can be realized on a computer. In case of the character string "Hundred" exemplarily shown in FIG. 10, and when the word dictionary 602 is registered with numerical words, there are outputted the word "Thousand" (the number of matched characters thereof is 3 (three)) and the word "Hundred" (the number of matched characters is 2(two)) from the registered words.

Next, it is judged whether the verification at the word verifying part 601 is an all-character matching, i.e., whether the recognition result obtained by the single-character recognizing part 401 has completely matched with what is stored in the word dictionary 602, i.e., completely matched character by character (step S52). Here, if all characters have matched, there is calculated an evaluation value E2 (step S62). The evaluation value E2 for a character string may be calculated from the reliability levels for the recognition results by the single-character recognizing part 401, and, for example, may be expressed by a product or sum of the reliability levels calculated by the single-character recognizing part 401.

It is then judged whether this character string evaluation value E2 is larger than a predetermined value SH4 (step S72). If larger, the recognition results obtained by the single-character recognizing part are adopted as the recognition result for the inputted character string (step S82). Contrary, if the character string evaluation value is smaller than the predetermined value, the single-character recognition results for the inputted character string are rejected. At this time, it is possible to individually examine the reliability levels of the single-character recognition results for respective character candidate patterns, and output only those recognition results having higher reliability levels. Note, the aforementioned SH4 can be set word by word by investigating that range from the character string for learning, in which range no misrecognition will occur. Also, the reliability levels of single-character recognition results for respective character candidate patterns can be set such as by investigating the reliability levels for correctly read patterns among those patterns used for learning of the single-character recognizing part.

Figure 7:
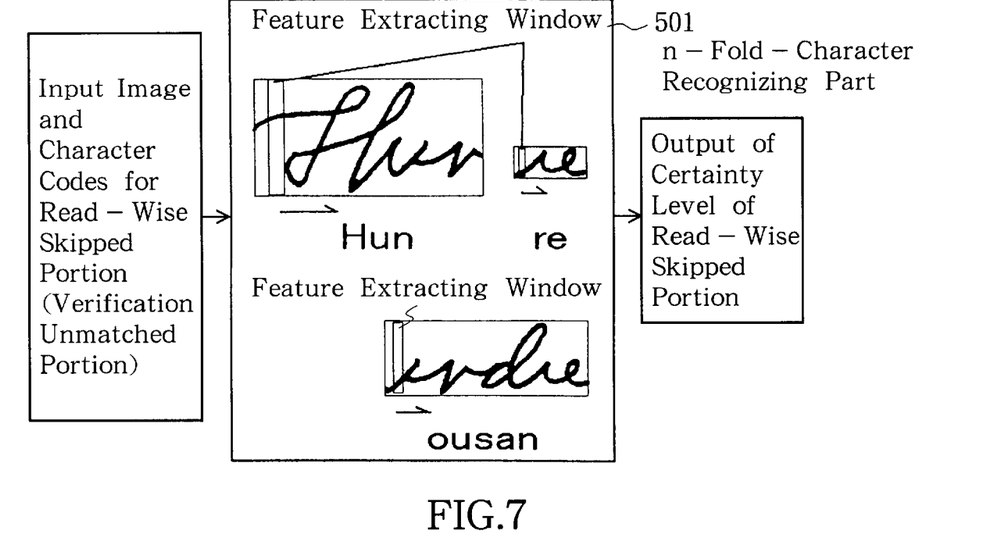
FIG. 7 is a view for explaining an n-fold-character recognizing part according to the second embodiment of the present invention.

In case of the character string "Hundred" exemplarily shown in FIG. 10, the number of matched characters calculated by the word verifying part 601 is not seven (7) which is the number of characters of the character string "Hundred", so that the processing as described below is conducted. Firstly, for respective words stored in the word verifying part 601, there are detected unmatched portions Ui (step S102). The character string "Hundred" exemplarily shown in FIG. 10 has an unmatched portion "ousan" relative to the codes "Thousand" having the maximum matching number 3 (three). Then, as shown in FIG. 7, there is taken out an image of a portion corresponding to "ousan", from the inputted image. The taken out image is sent to the n-fold-character recognizing part 501, together with the corresponding character string "ousan". The detection of this unmatched portion can be extracted by mutually integrating those character candidate patterns obtained by the character segmentation part 301, for that portion of the recognition result by the single-character recognizing part 401 which does not correspond to the word.

As shown in FIG. 7, the n-fold-character recognizing part 501 recognizes the transferred image by assuming that this image corresponds to the simultaneously transferred character string, and calculates its certainty level Ki (step S112). The n-fold-character recognizing dictionary 502 is stored with features for verification extracted from character string patterns for learning. The n-fold-character recognizing dictionary 502 may be set in a memory accessible from the n-fold-character recognizing part 501. As shown in FIG. 7, for the image of the portion corresponding to the unmatched portion, the n-fold-character recognizing part 501 utilizes a feature extracting window having a few tenth of a single character width, and keeps on extracting features within the feature extracting window while moving this feature extracting window from one end of the character string toward the other end thereof. As the features, there may be adopted the directional features used in the aforementioned "Tsukumo et al.: Handprinted Kanji Character Recognition based on Flexible Template Matching Proc. of 11th Intl. Conf. Pattern Recognition, pp.483–486 (1992)", and this feature change is applied to a state transition of automation to thereby perform recognition making use of a transitional situation of the state, similarly to the first embodiment of the present invention. Concretely, it can be realized on a computer, such as making use of "T. M. Ha et al.; Off-line Handwritten Numeral String Recognition by Combining Segmentation-based and Segmentation-free Methods, Pattern Recognition, Vol. 31, No. 3, pp. 257–272 (1998.3)", similarly to the first embodiment of the present invention. Further, in case of recognizing an image of a portion corresponding to an unmatched portion by the aforementioned method, there may be used a likelihood to be calculated simultaneously with a recognition result by the aforementioned method, for the recognition results corresponding to the number of characters within the contiguous block as well as the certainty level Ki for the recognition results. Moreover, character string may be expressed by a graph treating the end points and intersecting points of the former as nodes, to thereby conduct graph matching.

Next, at step S122, there is examined a magnitude of the certainty level Ki for the image recognition result as calculated by the n-fold-character recognizing part 501 (at step S112). When the certainty level Ki is equal to or smaller than SH5, the recognition result by the n-fold-character recognizing part 501 for the image of the portion corresponding to the unmatched portion is unselected and rejected, and it is judged that the currently hypothesized word is not a recognition result for the inputted word image (step S142). Thereafter, the step S102 and so forth are repeated in the descending order of the number of matched characters. In case of the character string "Hundred" exemplarily shown in FIG. 10, firstly extracted from the inputted word image is the image corresponding to "ousan" which is the unmatched portion with the word "Thousand" the number of matched characters of which is 3 (three), and there is calculated a reliability level where the image is hypothesized to be "ousan". In this example, since the reliability level is smaller than the aforementioned SH5, it is judged that the image corresponding to the unmatched portion is not "ousan". This means that the inputted word image is not the hypothesized word "Thousand". Then, the flow goes back to step S102 to thereby repeat the similar processing for the word "Hundred" the number of matched characters of which has the secondary larger value of 2 (two).

At step S122, there is examined the magnitude of the certainty level Ki for the image recognition result of the portion corresponding to the unmatched portion, as calculated by the n-fold-character recognizing part 501 (at step S112). When the certainty level Ki is equal to or greater than SH5, the character string hypothesized by the n-fold-character recognizing part 501 is adopted as the recognition result of the portion corresponding to the unmatched portion (step S132). In case of the character string "Hundred" exemplarily shown in FIG. 10, since two portions "d" have matched at the single-character recognition, those portions corresponding to the unmatched portions are two portions, "Hun" and "re". For the images corresponding to these two unmatched portions, there are calculated certainty levels by conducting the n-fold-character recognition while hypothesizing "Hun" and "re", respectively. In this case, since the certainty levels of the n-fold-character recognition for the two images corresponding to "Hun" and "re" are larger than SH5, these two images are judged to be "Hun" and "re", respectively. Note, the aforementioned SH5 can be set by investigating the upper limit value of reliability level upon occurrence of misreading for the patterns for learning.

Lastly, there is calculated a character string evaluation value E2 for the inputted word image, associatively with the two characters "d" and "d" recognized by the single-character recognizing part 401 (step S62). The character string evaluation value may be calculated from the reliability levels for the recognition results by the single-character recognizing part 401 and the certainty level for the recognition result by the n-fold-character recognizing part 501, and, for example, may be expressed by a product or sum of the reliability levels of the single-character recognition results and the certainty level of the n-fold-character recognition result.

It is judged whether this character string evaluation value E2 is larger than the predetermined value SH4 (step S72). If larger, the word hypothesized by the word verification is adopted as the recognition result (step S82). Contrary, when the character string evaluation value is smaller than the predetermined value, the recognition result for the inputted character string is rejected. Also, the reliability levels of single-character recognition results for respective character candidate patterns can be set such as by investigating the reliability levels for correctly read patterns among those patterns used for learning of the single-character recognizing part.

In the above, the processing has been conducted in the descending order of the number of matched characters upon word verification by the word verifying part 601. Further, in case of absence of any unmatched portions of the recognition result for a verified word, this word is treated as the recognition result for the inputted word image while omitting the n-fold-character recognition for those words having smaller numbers of matched characters. However, the processing at step S102 and so forth may be applied to all the words stored in the word verifying part 601. In such a case, when there are obtained a plurality of words which have been completely verified and which have the character string evaluation values larger than SH4: that word the character string evaluation value of which is larger than those of the other words may be adopted as a recognition result for an inputted word image; or both of the words in the first and second places may be outputted as candidates if the difference between the character string evaluation values of both words is very small.

Figure 8:
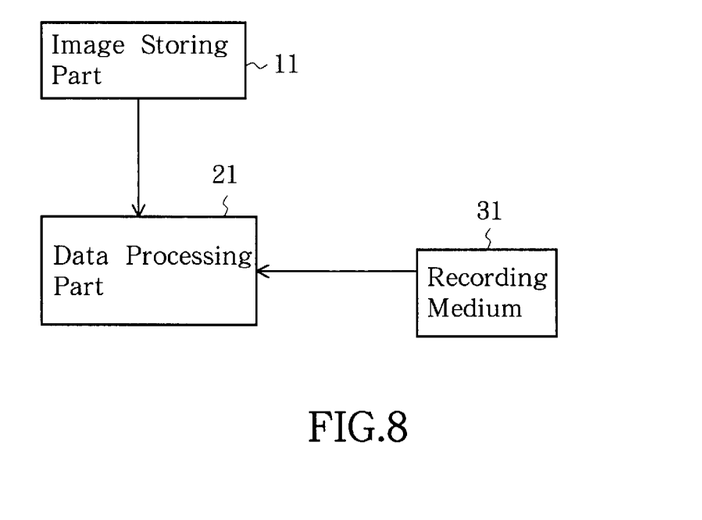
FIG. 8 is a flowchart showing an operation of a character recognition apparatus according a third embodiment of the present invention.

There will be described hereinafter a third embodiment of the present invention with reference to FIG. 8. FIG. 8 is constituted to include an image storing part 11, a data processing part 21 and a medium 31 recorded with a character recognition program. The data processing part 21 may be a usual computer, and the image storing part 11 can be realized by a main storage unit within the data processing part 21 or by an external storage unit. Further, the medium 31 may be a floppy disk, CD-ROM, DVD-ROM, semiconductor memory, and includes a situation in case of distribution via network.

The character recognition program is read from the medium 31 into the data processing part 21 so as to control the data processing part 21. By the character recognition program, the data processing part 21 firstly produces character candidate patterns character by character from the character string image inputted into the image storing part 11, and simultaneously therewith, detects portions where characters are contacting with each other to thereby estimate the number of contacting characters. This production of character candidate patterns character by character can be realized such as making use of "Nishiwaki and Yamada: A Contacted Numeral Segmentation Method on Black Ruled Line Forms; The Institute of Electronics, Information and Communication Engineers, Information and System Society Conference, D-12-3(1997)". Further, the estimation of the number of contacting characters may be calculated such as by dividing a width of character string by a height of the character string.

Next, there are judged character codes for respective character candidate patterns, and the reliability levels thereof are simultaneously calculated. Similarly to the first embodiment of the present invention, this single-character recognition operation can be realized such as making use of "Tsukumo et al.: Handprinted Kanji Character Recognition based on Flexible Template Matching Proc. of 11th Intl. Conf. Pattern Recognition, pp.483–486 (1992)". The reliability level for the character recognition result may be also obtained such as by taking a ratio of a distance value for a recognition result in the second place relative to distance value for a recognition result in the first place.

In case that the reliability level of single-character recognition is low and its character candidate pattern has been obtained from the character-contacting portion detected by the character segmentation part, there is conducted an n-fold-character recognition operation for the character-contacting portion comprising the character candidate pattern to thereby calculate a recognition result and a reliability level. When the reliability level is large, there is operatively adopted the recognition result of the n-fold-character recognition. As the features concerning this n-fold-character recognition, there may be adopted the directional features used in the aforementioned "Tsukumo et al.: Handprinted Kanji Character Recognition based on Flexible Template Matching Proc. of 11th Intl. Conf. Pattern Recognition, pp.483–486 (1992)", similarly to the first embodiment of the present invention. Further, the recognition can be realized making use of "T. M. Ha et al.; Off-line Handwritten Numeral String Recognition by Combining Segmentation-based and Segmentation-free Methods, Pattern Recognition, Vol. 31, No. 3, pp. 257–272 (1998.3)". Moreover, character string may be expressed by a graph treating the end points and intersecting points of the former as nodes, to thereby conduct graph matching. Note, in case that the number of characters within a character string is previously known, information about the corresponding number of characters for a contiguous block is passed to an n-fold-character recognition operation, for use in recognition. Further, in case of recognizing a contiguous block by the aforementioned method, there may be used a likelihood to be calculated simultaneously with a recognition result by the aforementioned method, for the recognition results corresponding to the number of characters within the contiguous block as well as the reliability level for the recognition results.

Figure 6:
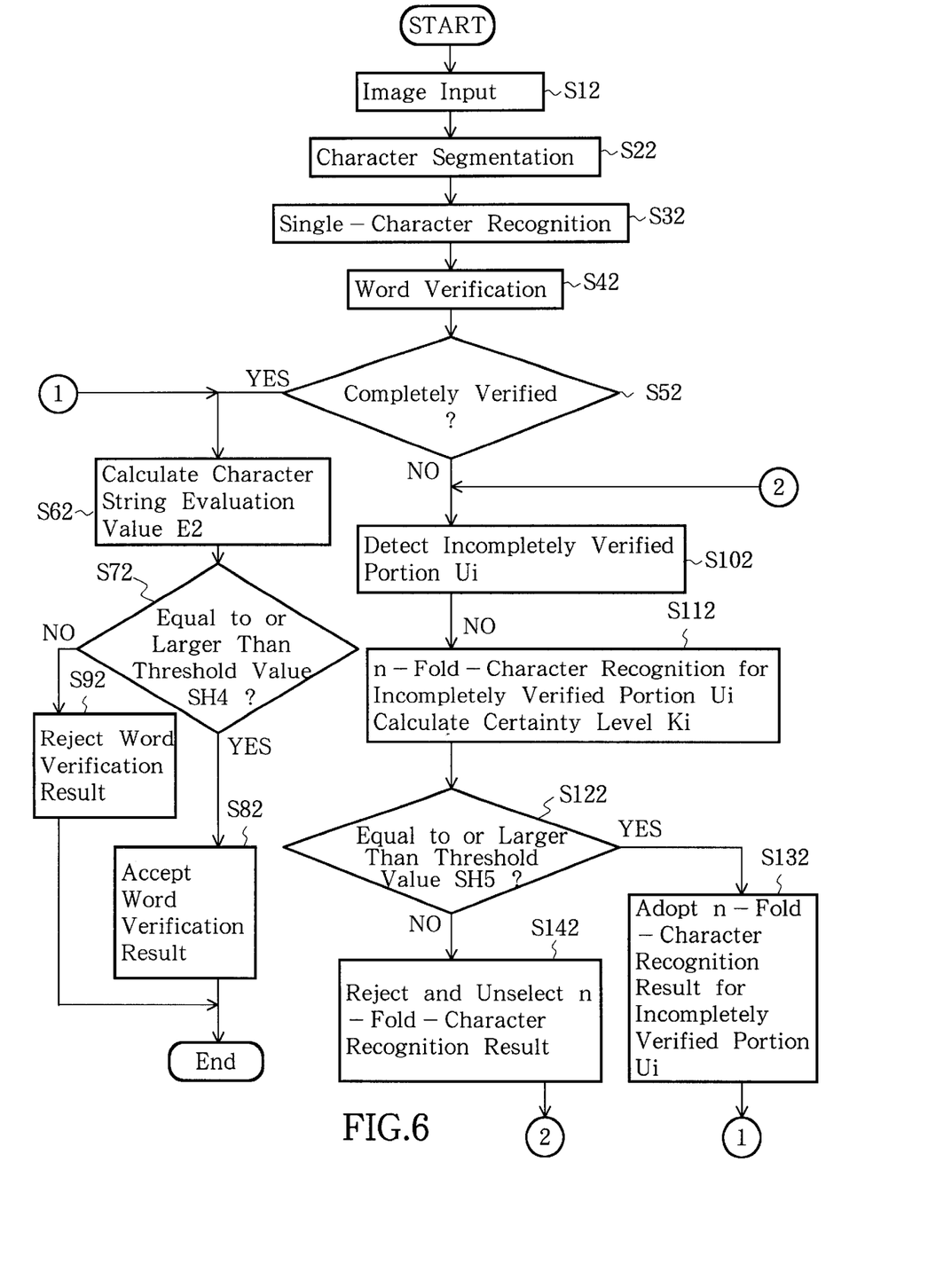
FIG. 6 is a flowchart showing an operation of a character recognition apparatus according a second embodiment of the present invention.

The word reading operation in the second embodiment of the present invention can be also realized in the constitution of FIG. 8 similarly to the third embodiment of the present invention, by preparing a program for performing the procedure steps of FIG. 6 by the operation of the controlling part 201 as explained in the second embodiment of the present invention, and by recording the program into the aforementioned recording medium 31. The production of character candidate pattern, single-character recognition, and n-fold-character recognition can be also realized similarly to the second embodiment of the present invention, by preparing programs based on the methods of "Nishiwaki and Yamada: A Contacted Numeral Segmentation Method on Black Ruled Line Forms; The Institute of Electronics, Information and Communication Engineers, Information and System Society Conference, D-12-3 (1997)", "Tsukumo et al.: Handprinted Kanji Character Recognition based on Flexible Template Matching Proc. of 11th Intl. Conf. Pattern Recognition, pp.483–486 (1992)", and "T. M. Ha et al.; Off-line Handwritten Numeral String Recognition by Combining Segmentation-based and Segmentation-free Methods, Pattern Recognition, Vol. 31, No. 3, pp. 257–272 (1998.3)", respectively; and the certainty level of single-character recognition and the reliability level of n-foldcharacter recognition can be calculated in the manner described in the second embodiment of the present invention.

According to the present invention as described above in detail, there can be realized a word recognition operation with higher recognition accuracy without ambiguousness, and the processing speed can be accelerated.

What is claimed is:

1. A character recognition apparatus comprising:

image storing means for inputting and storing a character string image;

character segmentation means for producing character candidate patterns character by character for the character string image inputted into said image storing means, and for detecting a character-contacting portion in the character string image to thereby estimate the number of characters in the character-contacting portion;

single-character recognition means for deciding character codes for the character candidate patterns character by character produced by said character segmentation means, and for outputting certainty levels of the character codes;

a single-character recognizing dictionary to be used by said single-character recognition means for decision n-fold-character recognition means for deciding character codes corresponding to n pieces of characters, when the character-contacting portion detected by said character segmentation means is estimated to include the n pieces of characters;

an n-fold-character recognizing dictionary that stores features for verification from character string patterns for learning to be used by said n-fold-character recognition means for decision;

word verification means for outputting verified words in a descending order of a matching number of characters for the registered candidate words, in accordance with single-character recognition results output by said single-character recognition means and n-fold-character recognition results output by said n-fold-character recognition means;

a word dictionary to be used by said word verification means upon verification; and controlling means for controlling said image storing means, said character segmentation means, said single-character recognition means and said n-fold-character recognition means, wherein said controlling means comprises:

adopting/stopping means for adopting recognition results outputted from said single-character recognition means by examining certainty levels for all of the recognition results character by character for the character string image and for stopping the recognition for the inputted character string image if all the certainty levels are larger than a predetermined value, and if outputted from said word verification means completely corresponds to the recognition result outputted from said single-character recognition means;

sending means for sending partial character string images corresponding to the unmatched portions in the single-character recognition results upon word verification toward said n-fold-character recognition means, together with an estimated number of characters and an estimated character codes of the unmatched portions, in a descending order of a matching number of characters for the unverified words when no verification results outputted from said word verification means completely corresponds to the recognition result outputted from said single-character recognition means and means for conducting, wherein said n-fold-character recognition means re-recognizes the partial character string images sent from said sending means and outputs the recognition results and certainty levels therefor, and when each of certainty levels for pertinent recognition results is larger than a predetermined value, each of the pertinent words being verified is kept as a final candidate, and an evaluation value for each of the whole character strings being verified is calculated that uses the certainty level outputted by the single-character recognition means for the portion for which said single-character recognition means has been activated and uses the certainty level outputted by said n-fold-character recognition means for the portion for which said n-fold-character recognition means has been activated and a word, which has the largest evaluation value among the words kept as the final candidates among the verified words, is adopted as a recognition result for the inputted character string.

2. A character recognition apparatus of claim 1, wherein said character segmentation means includes means for detecting a character boundary between contiguous characters upon producing the character candidate patterns character by character from the character-contacting portion, making use of a transition of run lengths of contiguous runs upon tracing black pixels in a vertical direction relative to a character string direction for black pixels of the character-contacting portion.

3. A character recognition apparatus of claim 4, wherein said character segmentation means includes means for detecting a character boundary between contiguous characters upon producing the character candidate patterns character by character from the character-contacting portion, making use of a maximum point and a minimum point in a vertical direction relative to a character string direction for a character stroke of the character-contacting portion.

4. A character recognition apparatus of claim 4, wherein said n-fold-character recognition means comprises means for conducting recognition for the whole of the character-contacting portion without dividing the character-contacting portion into character candidate patterns character by character and for outputting a certainty level of the recognition result thereof, while storing a recognizing dictionary for the whole recognition, in said n-fold-character recognizing dictionary.

5. A character recognition apparatus of claim 1, wherein said n-fold-character recognition means comprises means for assuming a rectangle surrounding a partial character string image corresponding to the character-contacting portion upon conducting recognition for the whole of the character-contacting portion without dividing the character-contacting portion into character candidate patterns character by character, for setting an area having a height corresponding to the height of the rectangle, and a width equal to or smaller than a single character width, for conducting recognition making use of a transition of a feature within said area, the transition being obtained for each movement of said area from one end of the rectangle toward the other end thereof and for outputting a certainty level of the thus obtained recognition result, while storing a recognizing dictionary therefor, in said n-fold-character recognizing dictionary.

6. A character recognition apparatus comprising:

an image storing part that inputs and stores a character string image;

a character segmentation part that produces character candidate patterns character by character for the character string image inputted into said image storing part, and detects a character-contacting portion in the character string image to thereby estimate the number of characters in the character-contacting portion;

a single-character recognition part that decides character codes for the character candidate patterns character by character produced by said character segmentation part, and that outputs certainty levels of the character codes;

a single-character recognizing dictionary to be used by said single-character recognition part for decision;

n-fold-character recognition part that decides character codes corresponding to n pieces of characters, when the character-contacting portion detected by said character segmentation part is estimated to include the n pieces of characters;

an n-fold-character recognizing dictionary that stores features for verification from character string patterns for learning to be used by said n-fold-character recognition part for decision;

a word verification part that outputs verified words in a descending order of a matching number of characters for the registered candidate words, in accordance with single-character recognition results output by said single-character recognition part and n-fold-character recognition results output by said n-fold-character recognition part;

a word dictionary to be used by said word verification part upon verification; and a controlling part that controls said image storing part, said character segmentation part, said single-character recognition part and said n-fold-character recognition part, wherein said controlling part comprises includes:

an adopting/stopping part that adopts recognition results outputted from said single-character recognition part by examining certainty levels for the recognition results character by character for the character string image and stops the recognition for the inputted character string image when all the certainty levels are larger than a predetermined value, and when a verification result outputted from said word verification part corresponds to the recognition result outputted from said single-character recognition part;

a sending part that sends partial character string images corresponding to the unmatched portions in the single-character recognition results upon word verification toward said n-fold-character recognition part, together with an estimated number of characters and an estimated character codes of the unmatched portions, in a descending order of a matching number of characters for the unverified words when no verification results outputted from said word verification part completely correspond to the recognition result outputted from said single-character recognition part; and a conducting part, wherein said n-fold-character recognition part re-recognizes the partial character string images sent from said sending part and outputs the recognition results and certainty levels therefor and when each of certainty levels for pertinent recognition results is larger than a predetermined value, each of the pertinent words being verified is kept as a final candidate, and an evaluation value for each of the whole character strings being verified is calculated that uses the certainty level outputted by the single-character recognition part for the portion for which said single-character recognition part has been activated and uses the certainty level outputted by said n-fold-character recognition part for the portion for which said n-fold-character recognition part has been activated and a word which has the largest evaluation value among the words kept as the final candidates among the verified words is adopted as a recognition result for the inputted character string.

7. The character recognition apparatus of claim 6, wherein said character segmentation part includes a part that detects a character boundary between contiguous characters upon producing the character candidate patterns character by character from the character-contacting portion, making use of a transition of run lengths of contiguous runs upon tracing black pixels in a vertical direction relative to a character string direction for black pixels of the character-contacting portion.

8. A character recognition apparatus of claim 6, wherein said character segmentation part includes a part that detects a character boundary between contiguous characters upon producing the character candidate patterns character by character from the character-contacting portion, making use of a maximum point and a minimum point in a vertical direction relative to a character string direction for a character stroke of the character-contacting portion.

9. A character recognition apparatus of claim 6, wherein said n-fold-character recognition part includes a part that conducts recognition for the whole of the character-contacting portion without dividing the character-contacting portion into character candidate patterns character by character and outputs a certainty level of the recognition result thereof, while storing a recognizing dictionary for the whole recognition, in said n-fold-character recognizing dictionary.

10. A character recognition apparatus of claim 6, wherein said n-fold-character recognition part comprises a part that assumes a rectangle surrounding a partial character string image that corresponds to the character-contacting portion upon conducting recognition for the whole of the character-contacting portion without dividing the character-contacting portion into character candidate patterns character by character, sets an area having a height corresponding to the height of the rectangle, and a width equal to or smaller than a single character width, conducts recognition, making use of a transition of a feature within said area, the transition being obtained for each movement of said area from one end of the rectangle toward the other end thereof and outputs a certainty level of the thus obtained recognition result, while storing a recognizing dictionary therefor, in said n-fold-character recognizing dictionary.

11. A machine readable recording medium recorded with a character string recognition program to be executed on a computer, said character string recognition program comprising the steps of:

inputting and storing a character string image;

producing character candidate patterns character by character for the inputted character string image, and detecting a character-contacting portion in the character string image to thereby estimate the number of characters in the character-contacting portion;

deciding character codes for the produced character candidate patterns character by character, and outputting certainty levels of the character codes, wherein features for verification from character string patterns for learning are applied in said deciding step;

performing word verification and outputting verified words in a descending order of a matching number of characters for the registered candidate words, in accordance with the single-character recognition results and the n-fold-character recognition results;

outputting the recognition results as a recognition result for the inputted character string when each of the certainty levels of the single-character recognition results and the n-fold-character recognition results is larger than a predetermined value, and when a word verification result corresponds to the outputted recognition result for the produced character candidate patterns; and when each of the certainty levels are smaller or equal to a predetermined value and involved in the character-contacting portion, then     deciding character codes corresponding to n pieces of characters for the character-contacting portion, and outputting a certainty level therefor;

sending partial character string images corresponding to the unmatched portions in the single-character recognition results upon said word verification, together with the estimated number of characters and the estimated character codes of the unmatched portions, in a descending order of a matching number of characters for the unverified words when no word verification results completely correspond to the outputted recognition result for the character candidate patterns; and     re-recognizing the partial character string images and outputting the recognition results and certainty levels therefor and when each of certainty levels for pertinent recognition results is larger than a predetermined value, each of the pertinent words being verified is kept as a final candidate, and an evaluation value for each of the whole character strings being verified is calculated that uses the outputted certainty level; and adopting as a recognition result for the inputted character string one of said words which has a largest evaluation value among the verified words kept as the final candidates.

\* \* \* \* \*